UNITED STATES PATENT OFFICE.

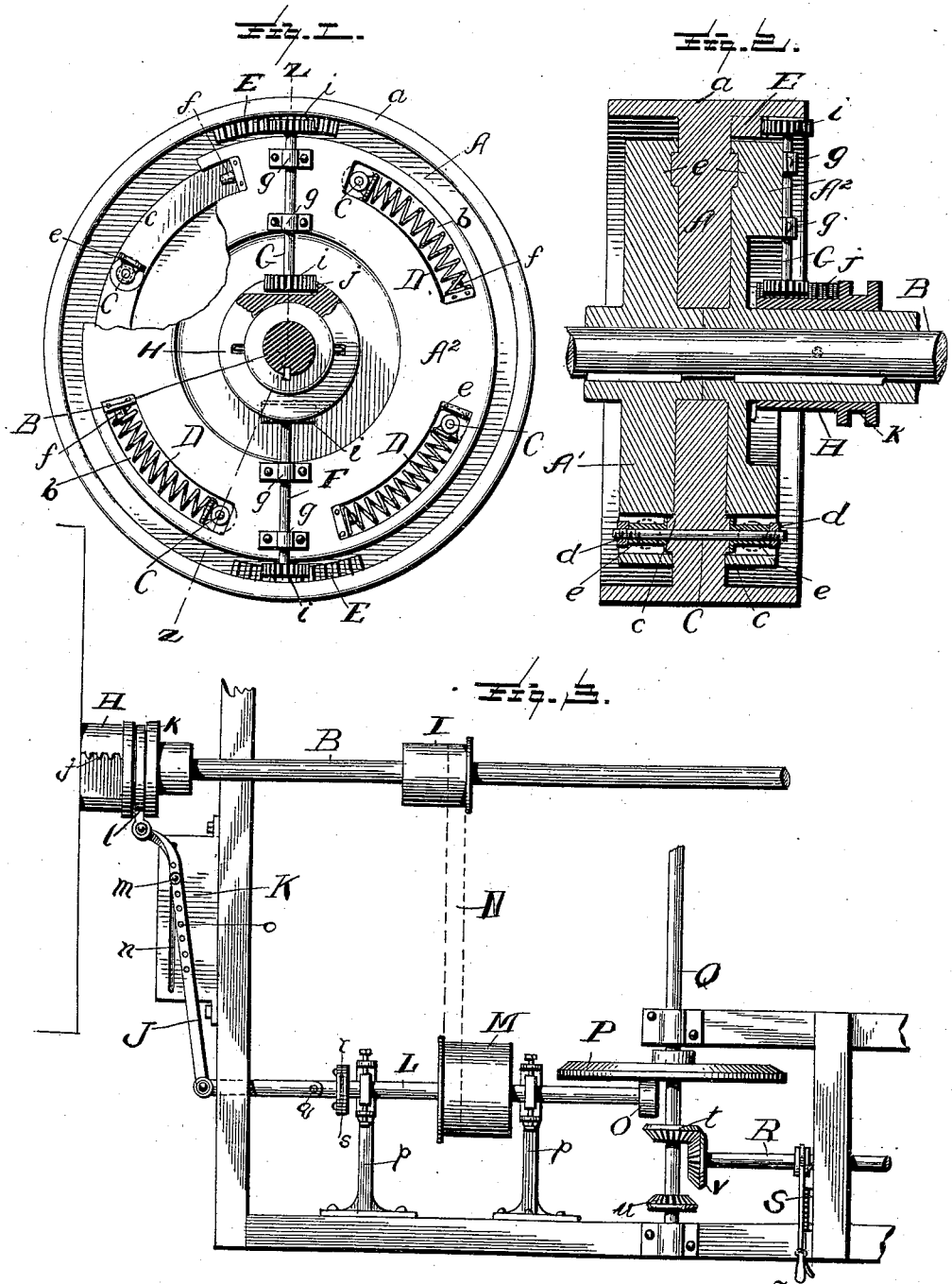

JOHN DAILY, OF MARENGO, OHIO.

GEARING.

SPECIFICATION forming part of Letters Patent No. 447,447, dated March 3, 1891.

Application filed October 10, 1890. Serial No. 367,699. (No model.)

*To all whom it may concern:*

Be it known that I, JOHN DAILY, a citizen of the United States, residing at Marengo, in the county of Morrow, State of Ohio, have invented certain new and useful Improvements in Gearing, of which the following is a specification, reference being had therein to the accompanying drawings.

This invention relates to certain new and useful improvements in gearing, and while it is designed, primarily, for use in connection with saw-mills it is applicable to other uses where it is desired to govern the power and make an even strain on the belt and other parts of the machinery.

The novelty in the present instance resides in the peculiar combinations and the construction, arrangement, and adaptation of parts, all as more fully hereinafter described, shown in the drawings, and then particularly pointed out in the appended claims.

The invention is clearly illustrated in the accompanying drawings, which, with the letters of reference marked thereon, form a part of this specification, and in which—

Figure 1 is a face view of the pulley on its shaft, which latter is shown in cross-section. Fig. 2 is a cross-section on the line $z$ $z$ of Fig. 1. Fig. 3 is a diagrammatic view showing the application of the invention to a saw-mill-driving mechanism.

Like letters of reference indicate like parts throughout all the views.

Referring now to the details of the drawings by letter, A designates the center portion of the pulley. B is the shaft. The part A has a wide rim $a$, preferably integral with its web and sufficiently wide for the belt with which it is to be used. The outer parts A' and A² of the pulley are fast upon the shaft and are preferably of such thickness as to be confined within the rim of the center part, as seen in Fig. 2. The two outer parts of the pulley have hubs which are sleeved upon the shaft and upon which the center part is sleeved loosely. The hub of one part projects, as seen in Fig. 2, to form a bearing for the movable collar hereinafter described. The hubs of the outer parts are keyed to the shaft in any suitable manner—as, for instance, as shown in Figs. 1 and 2.

The outer parts of the pulley are formed with curved slots $b$, preferably four in each part, as seen in Fig. 1, and these are arranged diametrically opposite each other, as shown. Passed through these slots are the pins C, which pass through the enlarged portion $c$ of the center part of the pulley, as seen best in Fig. 2, and are provided with adjusting-nuts $d$. (See Fig. 2.) These pins hold the seats $e$ for the springs D, the said seats being of any suitable construction, and to which one end of the coiled spring is secured or held. The other end of the spring is held on a teat or other contrivance, as $f$. (See Fig. 1.) These springs serve to equalize the strain and prevent injury to any of the parts by sudden shock.

At diametrically opposite points on the web of the center part of the pulley are affixed the segmental gear-plates E, as seen best in Fig. 1. Journaled in suitable boxes or bearings $g$ on the outer fixed part of the pulley are the shafts F and G, which carry at each end a gear-wheel $i$, the wheels at the outer ends of the said shafts being designed to mesh with the segmental gear-plates, as seen in Figs. 1 and 2, and those upon the inner ends designed to engage the toothed portions of the movable or sliding collar hereinafter described.

H is the sliding or movable collar free to slide endwise on the hub of the outer part of the pulley, as shown, and prevented from turning thereon in any suitable manner—as, for instance, as is shown in Fig. 1. This collar is provided with cogged portions $j$ upon opposite sides, as seen in the different views, and with these cogged portions the gear-wheels upon the inner ends of the shafts F and G are designed to engage, as seen in Figs. 1 and 2.

I is a band-pulley on the shaft B. The sliding collar is provided with an annular groove $k$, in which works one end of the lever J, or the portion $l$ thereof, the said lever being fulcrumed on the pin $m$, which engages the slot $n$ in the plate K, the other end of the lever being pivotally connected to the shaft L. The lever J is provided with a plurality of holes $o$, as seen in Fig. 3, so that the fulcrum of the lever may be readily changed to make change in feed to suit the power used on the machine.

The shaft L is journaled to slide endwise in the boxes or bearings $p$, which are suitably secured to some fixed part. There is a coupling $q$ in the shaft, so as to provide for deviation from a straight line in the operation of the machine. A suitable connection $r$ is made to permit of the revolution of the shaft. This is an expedient well known, and a detailed illustration thereof is not deemed necessary. Such provision is made at the point marked $s$ in Fig. 3.

On the shaft L is a band-pulley M, which is made sufficiently wide to provide for the endwise movement of the shaft. N is a band or belt connecting the pulleys M and I to convert motion from the shaft B to the shaft L.

On the end of the shaft L is a friction-roller O of any suitable material, preferably paper or leather, and this roller is designed to revolve in contact with the friction-disk P, as seen in Fig. 3. This disk is carried by the shaft Q, which is provided with the oppositely-arranged bevel-gears $t$ and $u$.

R is a shaft journaled in suitable bearings and arranged at right angles to the shaft Q. It carries a bevel-gear $v$, designed to mesh with either one or the other of the bevel-gears on the shaft Q. This shaft R conveys motion to the parts to be operated. It is movable in its bearings, being provided with a lever S, by which it may be adjusted to engage the bevel-pinion $v$ with either of the bevel-gears on the shaft Q, according to the direction in which it is desired to move the parts.

The operation is simple and will be readily understood from the above description when taken in connection with the annexed drawings. The speed is automatically regulated without any sudden shock or jar. As the springs are compressed under abnormal speed the geared parts cause the collar to be moved endwise on the hub, and this in turn moves the lever J on its pivot, which moves the friction-roller nearer to or farther from the center of the friction-disk and moves the shaft Q faster or slower according to whether the friction-roller is traveling near its center or periphery. The endwise movement of the shaft L regulates the relative positions of the friction-roller and friction-disk.

Having thus described my invention in its preferable form, what I claim as new is—

1. The combination, with the central and outer parts of the pulley, of the connecting-pins held in the central part and working in curved slots in the outer parts, and the circumferentially-arranged springs, as set forth.

2. The combination, with the central and outer parts of the pulley, of the pins held in the central part and working in curved slots in the outer parts, the spring-seats held thereby, and the coiled springs held at one end by said seats, substantially as specified.

3. The combination, with the central and outer parts of the pulley, of the segmental geared plates on the outer part and the sliding sleeve operated through connection with the geared plates, as set forth.

4. The combination, with the central and outer parts of the pulley, of the geared plates on the outer part, the sliding sleeve having gear portion, and the shaft journaled on a fixed part of the pulley and carrying gears meshing with the plate and with the gear portion of the sleeve, substantially as specified.

5. The combination, with the shaft, the central part of the pulley, the outer parts fixed to the shaft and having hubs on which the center part is loosely sleeved, the sleeve or collar sliding on the hub, the segmental geared plates on the center part of the pulley, the shafts journaled on one of the fixed parts of the pulley, and the pinions on the shafts meshing with the geared plates and with gear portions on the sliding collar, as set forth.

6. The combination, with the pulley, as described, of the friction-disk, the endwise-movable shaft, the friction-roller carried thereby, the sliding collar of the pulley and the gear thereof, and connections, substantially as described, between the sliding shaft and collar, whereby the movement of the latter governs the speed of the disk-shaft, as set forth.

7. The combination, with the friction-disk and its shaft, of the friction-roller, its shaft movable endwise in its bearings, and the lever pivotally connected with the last-mentioned shaft, of the pulley and its geared portion $j$ and movable collar, and a connection between the collar and lever, substantially as specified.

8. The combination, with the friction-disk, its shaft, the friction-roller and its shaft movable endwise in its bearings, and the lever pivotally connected with the endwise-movable shaft and provided with adjustable fulcrum, of the pulley and its geared portion $j$ and movable collar connected with the said lever, substantially as specified.

In testimony whereof I affix my signature in presence of two witnesses.

JOHN DAILY.

Witnesses:
J. A. NOE,
GEORGE WELLER.